United States Patent [19]
Rich et al.

[11] Patent Number: 4,853,945
[45] Date of Patent: * Aug. 1, 1989

[54] SCINTILLATION MULTIPLEXER

[75] Inventors: Arthur Rich; Bernard W. Agranoff, both of Ann Arbor, Mich.

[73] Assignee: The University of Michigan, Ann Arbor, Mich.

[*] Notice: The portion of the term of this patent subsequent to Sep. 13, 2005 has been disclaimed.

[21] Appl. No.: 203,789

[22] Filed: Jun. 7, 1988

Related U.S. Application Data

[63] Continuation-in-part of Ser. No. 906,173, Sep. 11, 1986, Pat. No. 4,771,444.

[51] Int. Cl.$^4$ .............................................. G01T 1/208
[52] U.S. Cl. ..................................... 377/10; 356/336; 356/338; 250/328; 382/6
[58] Field of Search .................. 377/10; 356/336, 338; 250/328; 382/6

[56] References Cited

U.S. PATENT DOCUMENTS

| | | | |
|---|---|---|---|
| 3,723,736 | 3/1973 | Laney | 250/328 |
| 4,005,292 | 1/1977 | Oesterlin et al. | 250/328 |
| 4,194,117 | 3/1980 | Gross | 250/328 |
| 4,206,504 | 6/1980 | Frey | 377/10 |

Primary Examiner—John S. Heyman
Attorney, Agent, or Firm—Rohm & Monsanto

[57] ABSTRACT

A liquid scintillation counter system utilizes multiplexing to monitor scintillation events in a continuously flowing effluent, using relatively few sensors, such as photomultiplier tubes, each such photomultiplier tube, in a specific embodiment, receiving light generated by scintillation events at a plurality of predetermined monitoring points along the flow path of the effluent. Each monitoring point, is coupled by means of light guides to at least two of the photomultiplier tubes. Some background noise is eliminated by use of discriminators which establish a predetermined threshold level for the magnitude of the outputs of the photomultiplier tube, above which the pulses are countable. Coincident circuitry is used to determine the presence of a scintillation event, and thereby issue a coincidence pulse which is counted. In accordance with the invention, n photomultiplier tubes can be used to monitor (n/2)(n−1) monitoring points along the flow path.

17 Claims, 5 Drawing Sheets

SCINTILLATION MULTIPLEXER

This is a continuation-in-part of application Ser. No. 906,173, filed Sept. 11, 1986, now U.S. Pat. No. 4,771,444.

BACKGROUND OF THE INVENTION

This invention relates generally to multiplexing systems, and more particularly to a scintillation monitoring system wherein a predetermined number of light sensors monitor and count scintillation events in a greater number of scintillation samples, or a larger number of monitor points than there are light sensors.

Liquid scintillation counting of low level radioactivity is commonplace in laboratories where pharmacological, biochemical, or molecular biological research is conducted. In addition, such scintillation monitoring systems are found in hospitals and clinics which perform laboratory tests as part of clinical procedures. In a typical scintillation monitoring arrangement, scintillation counters automatically count between one hundred and three hundred sequential samples each for a time period typically between one and twenty minutes. Counting is generally performed for a predetermined period of time, or a predetermined number of counts, or some variation of these two limits. In either case, statistical fluctuations in a given sample are generally required to be lower than five percent. Assuming that Gaussian statistics are applicable to such counting, two thousand disintegrations per sample are implied.

In addition to the need to count scintillation events in sequential samples, there is a need to count scintillation events in a continuous flow process, such as in a chromatography column, without interruption of the flow or batch processing. However, a system for achieving a continuous count of flowing effluent would require a large number of photosensors, depending upon the speed of the flow of the effluent and its radioactivity. Moreover, the photosensors should be arranged in pairs to achieve a reliable count of the scintillation events, while reducing the effects of noise.

It is a problem with known systems that they are expensive to purchase, use, and maintain. For example, typical scintillation counters cost between $15,000.00 and $30,000.00, and generally require approximately $2,000.00 per year to maintain. This requires a high rate of throughput for economic reasons. One approach to the problem of achieving high throughput is to add sufficient radioactivity to the initial reaction to achieve a high count rate in the product which is to be measured. Such highly radioactive samples, however, raise the problem of a significant addition to the cost of the laboratory procedure, possibly offsetting whatever financial gain might be derived from a shorter counting time. In addition, potential environmental hazards are produced in the laboratory as a result of usage of large amounts of radioactivity. It is highly desirable for health reasons to keep the usage of radioactivity to a minimum. In many radiolabeling procedures, only a fraction of a percent of the added radioactivity is incorporated and counted, and the remainder must be disposed of. In addition to the foregoing, it should be noted that the biohazards resulting from use of radioactivity extend beyond the laboratory. For example, long-term storage of low-level radioactive waste is receiving increased public attention. Tritium and $^{14}C$ are particular sources of concern since they have half-lives of 12 years and 5,600 years, respectively. The cost of waste disposal has escalated and may eventually become the limiting factor in biomedical research which employs radioactivity.

It is evident from the foregoing that there is a need for a scintillation monitoring system which can monitor the occurrence of scintillation events in a large number of samples simultaneously. Such a system would be particularly useful in biodistribution studies which use new radiotracer drugs, particularly for human applications. Such biodistribution studies are necessary to see how the drug is metabolized and which organ receives the highest radiation dose. The nuclides involved may have half-lives from 2 minutes ($^{15}O$) to 20 minutes ($^{11}C$). With such short half-lives, it is necessary to inject large amounts of material so that by the time the last tissue is counted in a conventional scintillation counter, there will remain sufficient radioactivity for accurate measurement. There is a need for a counting system which will measure all tissues simultaneously thereby obviating the need to correct for decay of the isotopes, since all samples will be decaying constantly, and the percent distribution to the various tissues will not vary during the counting period.

It is, therefore, an object of this invention to provide a simple and inexpensive system which can accommodate a broad range of scintillation sources.

It is another object of this invention to provide a simple and inexpensive scintillation monitoring system which can monitor many scintillation vials simultaneously.

It is a further object of this invention to provide a scintillation monitoring system which requires relatively few sensors, such as photomultiplier tubes, and has a high throughput.

It is an additional object of this invention to provide a scintillation monitoring arrangement which affords a reduced consumption of radioactive materials.

It is still another object of this invention to provide a system for simultaneously counting scintillation events from multiple vials at moderate cost.

It is a still further object of this invention to provide a system which is useful for multiple simultaneous short half-life experiments.

It is also an object of this invention to provide a system for which light collection efficiency can easily be measured.

It is yet another object of this invention to provide a multiplexing system which employs multiple inputs to each of a plurality of sensors and coincidence logic.

It is also another object of this invention to provide a system for monitoring 25 or more radioactive samples using less than two photodetectors per vial.

It is also a further object of this invention to provide a multiplexing sytem which utilizes relatively few sensors to monitor many samples without intolerable cross-talk interference.

It is additionally an object of this invention to provide a system which achieves high efficiency using common beta-emitting radionuclides, such as $^3H$, $^{14}C$, $^{32}P$, and $^{35}S$.

It is yet another object of this invention to provide a system which achieves high throughput without requiring high levels of radioactivity.

It is a yet further object of this invention to provide a system which facilitates in vivo biodistribution studies of short-lived isotopes.

It is additionally another object of this invention to provide a system which enables sensing of multiple labels simultaneously.

A still further object of this invention is to provide a scintillation monitoring system which permits continuous flow to be monitored, without interruption.

An additional object of this invention is to provide a scintillation monitoring system which permits a continuous flow path to be monitored at multiple points therealong without requiring a correspondingly large number of sensor pairs.

Yet another object of this invention is to provide a system for monitoring a continuous flow output from a chromatography column whereby the effective time of exposure of a photosensor to a particular quantum, or slug, of the effluent of the column is increased, without slowing the flow.

SUMMARY OF THE INVENTION

The foregoing and other objects are achieved by this invention which provides a multiplexing arrangement for monitoring simultaneously the occurrence of detectable events, such as scintillation events, in continuously flowing effluent. In accordance with the invention, a plurality of sensors receive indications of the events and produce responsive output electrical signals. Light guides are provided for coupling optically each of a plurality of monitor points along the flow path of the effluent to at least two of the sensors. Each such sensor is arranged to receive light from a plurality of the monitor points along the flow path. The particular point along the flow path to which an event is to be attributed is determined by circuitry which determines the coincidence of light at two of the sensors.

In one embodiment of the invention, a discriminator is coupled to the output of a sensor to ensure that only output signals having a magnitude greater than a predetermined value are conducted to the coincidence-determining circuitry. Such discriminators therefore establish a minimum magnitude and serve to reduce the effect of background noise.

In a further embodiment, the discriminators are connected at their output to a coincidence monitoring arrangement which operates to cancel events. Thus, for example, if three discriminators issue output signals simultaneously in a system where the scintillation light from each sample is conducted to two sensors, then a signal is issued which cancels the event from being counted. In certain embodiments, the cancellation signal may operate to disable the coincidence-determining circuitry.

The benefits of the present invention are achieved when there are at least three sensor means. However, in embodiments where n sensors are provided, the maximum number m of positions which can be monitored simultaneously is defined by $(n/2)(n-1)$. Thus, in an embodiment where four sensors are provided, as many as six samples can be monitored simultaneously.

While the $(n/2)(n-1)$ equation describes the minimum number of phototubes needed for coincidence counting of a fixed number of monitoring points along the flow path, other constraints such as placement of light pipes may lead to the preferential use of additional phototubes in order to create a more compact instrument or multi-vial cassette. This invention applies to all arrays in which light from more than one vial is shared by a given phototube, resulting in less than two phototubes per monitoring point along the flow path.

The usual method for measuring the radioactivity of liquid scintillation (LS) samples is to detect simultaneous events in each of the two photomultiplier tubes (PMT's) viewing the sample. This procedure greatly reduces the number of background events below what a single PMT would detect. The most straightforward way to increase the number of samples that can be counted at one time is to provide two PMT's for each sample. Thus, the total number of samples (m) that n detectors would count is m=n/2. The device described herein makes multiple use of each PMT, allowing it to view n−1 different samples, or monitoring points, and resulting in n detectors viewing m=($\frac{1}{2}$)(n)(n−1) samples. Simultaneous signals in a given pair of detectors must then be electronically decoded to ascertain which sample gave rise to the event.

Two major problems will arise when a given PMT views many samples, or monitoring points along a flow path in continuous flow embodiments of the invention. First, the necessity of piping the light from the sample to a detector some distance away (as opposed to the close sample-detection coupling in current model LS counters) provides an opportunity for light to be lost, and consequently, the efficiency $\eta$ for detecting a given event would be decreased. Secondly, since a given PMT views more than one sample, two accidentally simultaneous events in different samples [e.g., (a,b) and (c,d)] could be recorded as an event in a third sample [e.g., (a,c)] where no real event occurred. In a standard LS counter one can measure the background rate with no sample radioactivity present and obtain an accurate measure of the total background, even with high activity in all of the other samples. The crosstalk component of the background will be absent when no radioactivity is present. In order to estimate the effect of these two problems one must first calculate the counting rate $S_{ab}$ expected for sample (a,b):

$$S_{ab}=\eta R_{ab}+B_{ab} \qquad \text{(Eq. 1)}$$

Here, $R_{ab}$ is the actual decay rate of the radioisotope in sample (a,b) and $B_{ab}$ is the total background rate at position (a,b).

The detection efficiency $\eta$ is obtained by averaging the probability P(E) of detecting both signals from a $\beta$ particle of energy E, weighted by the $\beta$ energy spectrum N(E):

$$\eta = \frac{\int_o^{E_o} N(E)P(E)dE}{\int_o^{E_o} N(E)dE} \qquad \text{(Eq. 2)}$$

Here, $E_0$ is the maximum energy of the $\beta$ energy spectrum and P(E) is given by $P(E)=[1-Q(E)]^2$, where Q(E) is the probability of missing the signal from a single detector $[Q(E)=(1-f_c \text{ Q.E.})^{\overline{\eta}}]$. We define: $\overline{\eta}=C_{conv}E$ the average number of photons produced by a particle of energy E (typically, $C_{conv}=5/\text{KeV}$), Q.E. the quantum efficiency of the PMT (typically 25%), and $f_c$ the fraction of the scintillation light which actually reaches a given detector.

The background $B_{ab}$ is composed partially of events which occurred in (a,b), induced either by cosmic rays $B_{ab}{}^{(CR)}$ or by the natural background radioactivity of the surroundings $B_{ab}{}^{(nat)}$, and partially of the accidental coincidence of signals in PMT's a and b, unassociated with a real event in (a,b):

$$B_{ab} = B_{ab}^{(CR)} + B_{ab}^{(nat)} + \Delta T [B_a^{(DK)} + \eta_1 R_a^{(T)}][B_b^{(DK)} + \eta_1 R_b^{(T)}] \quad \text{(Eq. 3)}$$

Here, $\Delta T$ (typically $10^{-8}$ sec) is the maximum time separation for two signals to be considered as coincident, $B_a^{(DK)}$ is the dark count rate in detector a (typically 20,000 CPM), $R_a^{(T)}$ is the total decay rate in all samples other than (a,b) that share detector a, and $$\eta_1 = \frac{\int_0^{E_o} N(E)[1-Q(E)]dE}{\int_0^{E_o} N(E)dE}$$

is the single detector efficiency. If no activity is present at any sample position, the count rate will be:

$$B_{ab}^{(0)} = B_{ab}^{(CR)} + B_{ab}^{(nat)} + \Delta T B_a^{(DK)} B_b^{(DK)} \quad \text{(Eq. 4)}$$

This part of the background is easily measurable, and if it were the whole background, a measurement of $B_{ab}^{(0)}$ could be used with a measurement of $S_{ab}$ and with Eq. 1 to yield an accurate value for $R_{ab}$. The presence of the crosstalk background $B_{ab}^{(CT)} \equiv B_{ab} - B_{ab}^{(0)}$ can cause measurement errors as illustrated in the following extreme example: Consider a sample at position (a,b) with activity $R_{ab}$. If all the other samples in an n=15 detector arrangement (m=105 samples) are high activity samples ($R_o$=20,000 DPM), the crosstalk background will be:

$$B_b(CT) = \overbrace{(n-1)R_o\eta_1(B_a^{(DK)} + B_b^{(DK)})}^{1.0\ CPM} + \overbrace{(n-1)^2 R_o^2 \eta_1^2 \Delta T}^{4.0\ CPM} = 5.0\ CPM \quad \text{(Eqn. 5)}$$

where $\Delta T = 10^{-8}$ sec, $\eta_1 = 55\%$, and $B_a^{(DK)} = B_b^{(DK)} = 20,000$ CPM. If we use $\eta = 35\%$ with Eq. 1, we obtain $R_{ab}^{(0)}$, the calculated decay rate compensated only for $B_{ab}^{(0)}$:

$$R_{ab}^{(0)} = \frac{S_{ab} - B_{ab}^{(0)}}{\eta} = R_{ab} + \overbrace{\frac{B_{ab}^{(CT)}}{\eta}}^{15\ DPM}$$

For most experimental situations an uncompensated 15 DPM shift in the measured activity of a sample is an acceptable error, so one response to the existence of $B_{ab}^{(CT)}$ is to limit the maximum decay rate in any sample to less than some $R_o$ (in this example, $R_o$=20,000 DPM) which will insure that $R_{ab}^{(0)} - R_{ab} < 15$ DPM. Table 1 lists four arrangements and specifies limits on the maximum activity $R_o^{(max)}$ a sample can have and yet to be assured that the shift in the measured activity induced by the crosstalk background is less than 15 DPM in all samples. A second response to this shift is to calculate $B_{ab}^{(CT)}$ from Eqn. 3 using $$R_{ax}^{(0)} = \frac{S_{ax} - B_{ax}^{(0)}}{\eta},$$

where x is any detector other than b which shares a sample with detector a to generate the sum $R_a^{(T)}$.

TABLE I

| detectors n | 4 | 10 | 15 | 20 |
|---|---|---|---|---|
| samples m | 6 | 45 | 105 | 190 |
| $R_o^{(max)}$ | 95,000 DMP | 30,000 DPM | 20,000 DPM | 15,000 DPM |

BRIEF DESCRIPTION OF THE DRAWING

Comprehension of the invention is facilitated by reading the following detailed description in conjunction with the annexed drawing, in which.

DETAILED DESCRIPTION

Figure 1:
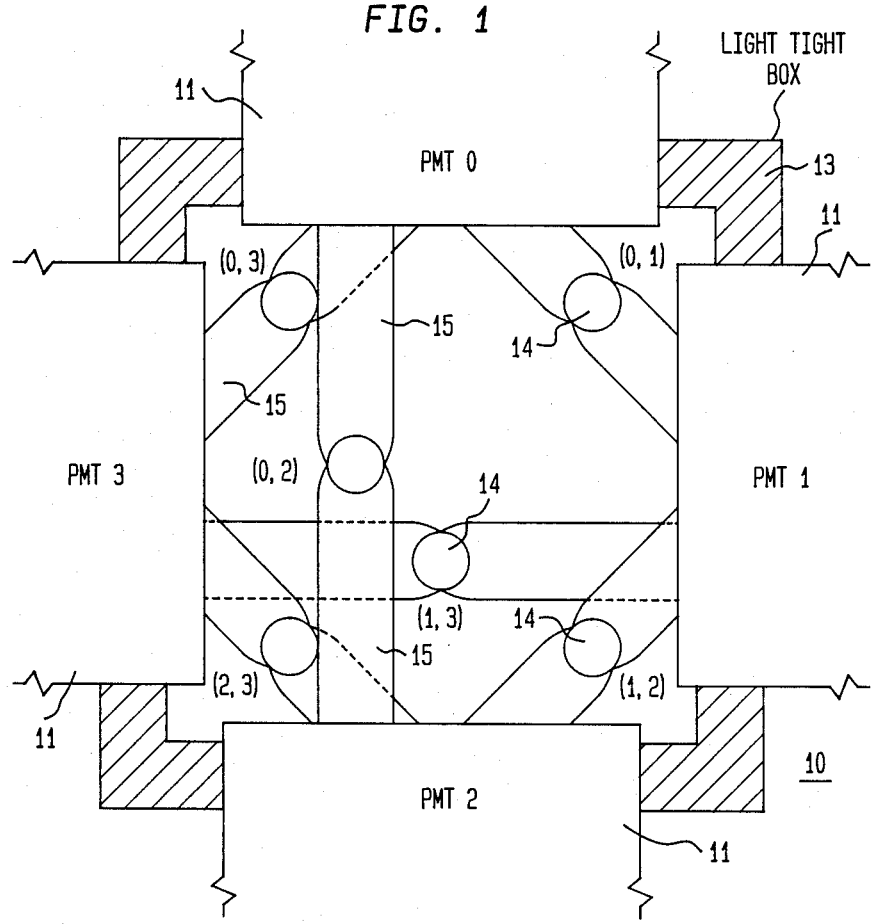
FIG. 1 is a schematic representation of a top view of a specific illustrative embodiment of the invention wherein four photomultiplier tubes monitor scintillation events in six samples.

FIG. 1 is a schematic representation of a simultaneous multivial beta counter (SMBC) 10 constructed in accordance with the principles of the invention. The specific illustrative embodiment of FIG. 1 utilizes four detectors 11, each of which is identified as a photomultiplier tube (PMT) with an associated number 0-3. Detectors 11 are arranged, in this embodiment, in respective walls of a light tight box 13.

A plurality of light-receiving positions 14 are each coupled to a respectively associated pair of detectors 11 by means of light guides 15. Thus, any light which is emitted at light-receiving positions 14 is conducted to the associated pair of detectors by corresponding ones of the light guides. Each light-receiving position has further associated therewith in this figure a number pair which identifies the associated detector. It can further be seen in this figure that each detector, in this embodiment, receives light from a plurality of light-receiving positions.

Figure 2:
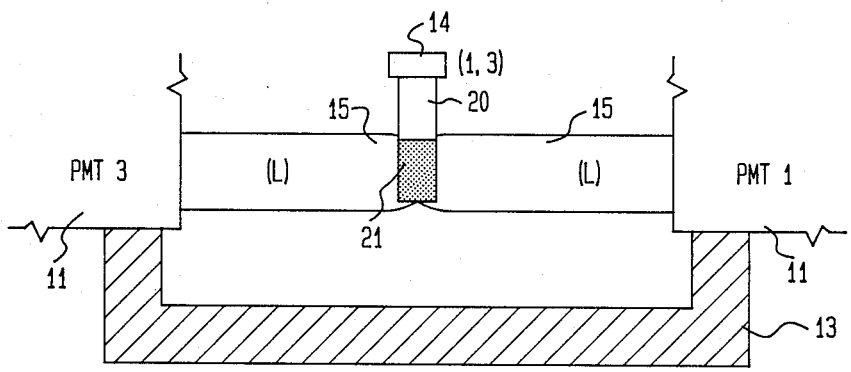
FIG. 2 is a side view of the schematic representation of FIG. 1 showing the optical coupling between a sample and two photomultiplier tubes.

FIG. 2 is a side view of the schematic representation of FIG. 1 and shows light-receiving position 14 (1,3) coupled to detectors 11 (PMT 3 and PMT 1) by light guides 15. In this figure, light-receiving position 14 is shown to be a vial 20 which has therein a scintillation sample 21. The light which is emitted from the scintillation sample by the occurrence of scintillation events is conducted through the translucent wall of vial 20, through light guide 15, and to PMT 3 and PMT 1.

Figure 3:
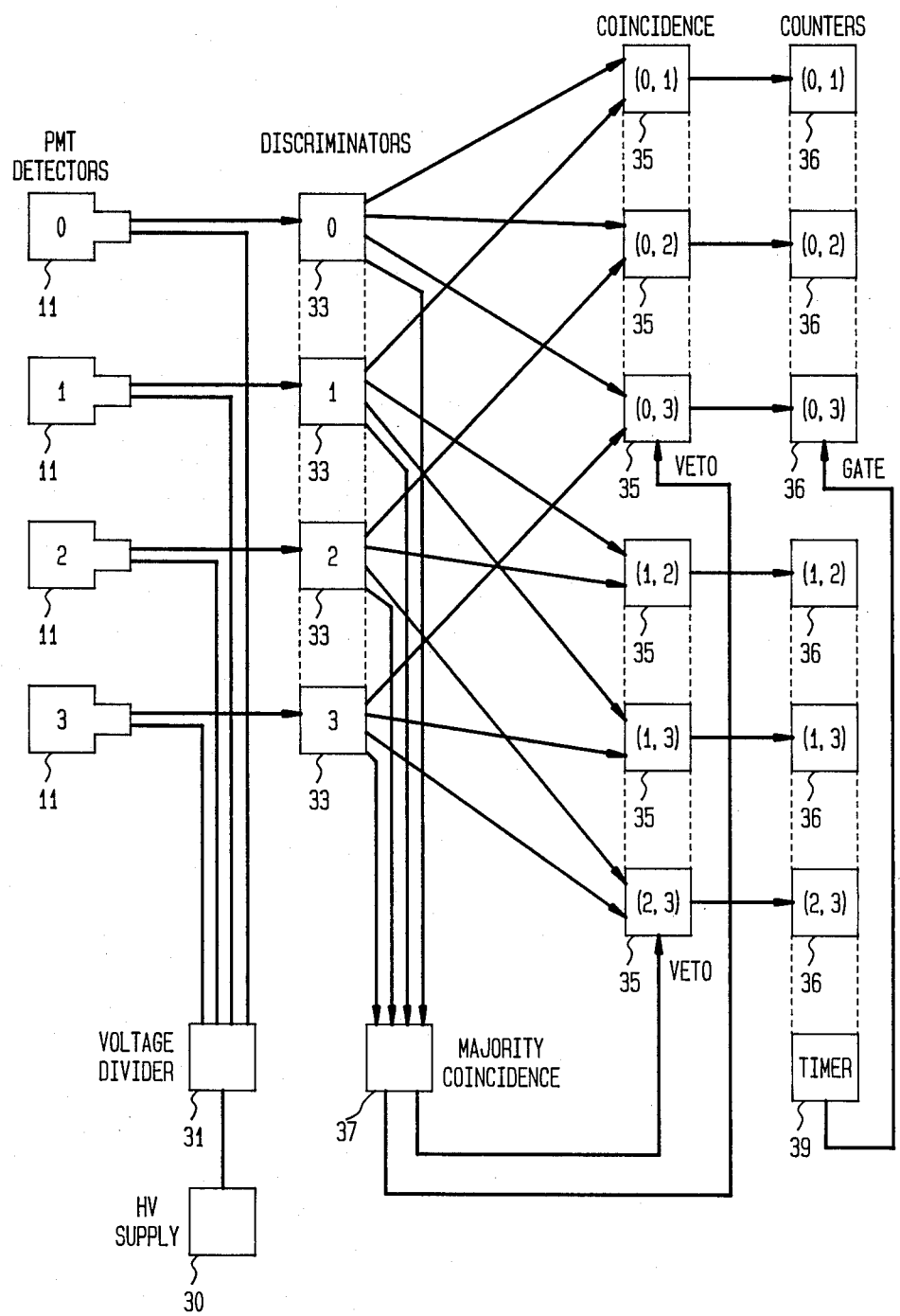
FIG. 3 is a block and line representation of decoding circuitry for use in the illustrative embodiment of FIG. 1.

FIG. 3 is a block and line representation of a specific illustrative embodiment of decoding circuitry which operates to count the scintillation events from the respective scintillation samples (not shown in this figure). Each of the detectors is powered by a high voltage supply 30, the voltage of which is controlled by a voltage divider arrangement 31. Each detector 11 is connected at its output to a respectively associated one of discriminators 33 which operate to produce pulses which are their respective outputs only when the signals from the detectors exceed a predetermined threshold level. In this embodiment, discriminators 33 may be of the type which utilizes a descrimination window whereby distinctions can be made in regard of the relative amplitudes of the incoming pulses from detectors 11. In this manner, pulse height analysis can be utilized to enable monitoring in a multiple labeling environment. The outputs of the discriminators are conducted to respective ones of coincidence units 35, each of which has two inputs and one output. An output pulse is issued by each coincidence unit when simultaneous input pulses are received. The outputs of the coincidence units are coincidence signals which are conducted to respective ones of counters 36.

In this embodiment, if signals from three or four discriminators are present simultaneously in the system, a majority coincidence unit 37 produces a pulse which cancels that event for all counters. In this embodiment, issuance of coincidence signals is prevented by majority coincidence unit 37. Thus, only simultaneous pulses in exactly two discriminators will trigger a count in exactly one corresponding counter. Counters 36 are gated by an associated timer 39.

Figure 4:
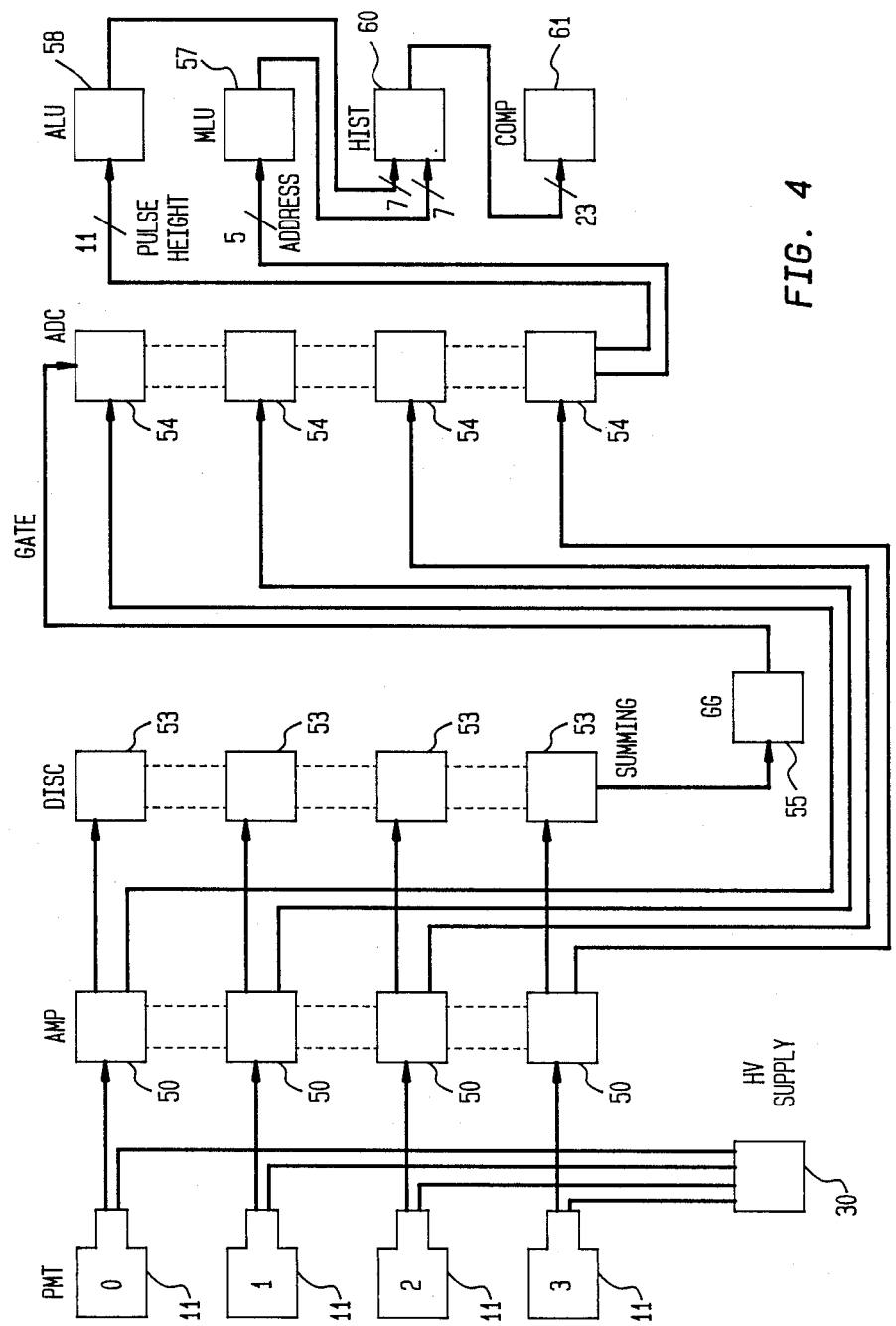
FIG. 4 is a block and line representation of a further illustrative embodiment of decoding circuitry.

FIG. 4 is a block and line representation of a further specific illustrative embodiment of decoding circuitry which operates to count the scintillation events. In this embodiment, each of detectors 11 is powered by a high voltage supply 30, in a manner which may be similar to that described hereinabove with respect to FIG. 3. The output of each detector is conducted to an associated one of amplifiers 50, each of which supplies an output signal to associated ones of discriminators 53 and analog-to-digital convertors 54.

The summing output of the discriminators triggers a gate generator 55 which produces at its output a pulse if two or more discriminators have fired. The gate generator output activates the analog-to-digital convertors which record a pulse height for each detector signal. If signals from exactly two detectors, a and b, are present a memory logic unit 57 records which pair (a,b) was activated. An arithmetic logic unit 58 calculates a sum, A, of the pulse heights of a and b. Both items of information are provided to a histogramming memory 60 which histograms each event (a,b,A). After histogramming memory 60 has accumulated data for a predetermined period of time, its contents are read by a computer 61. The computer processes the information received from the histogramming memory and identifies those items of data having pulse heights A which are appropriate to the particular isotope or isotopes being used in the system. Thus, the signal detected in the detectors are tested for simultaneity and total pulse height by the decoder system of FIG. 4. If the total pulse height is within the range appropriate for a preselected radioisotope, the count is recorded for the appropriate sample.

Figure 5:
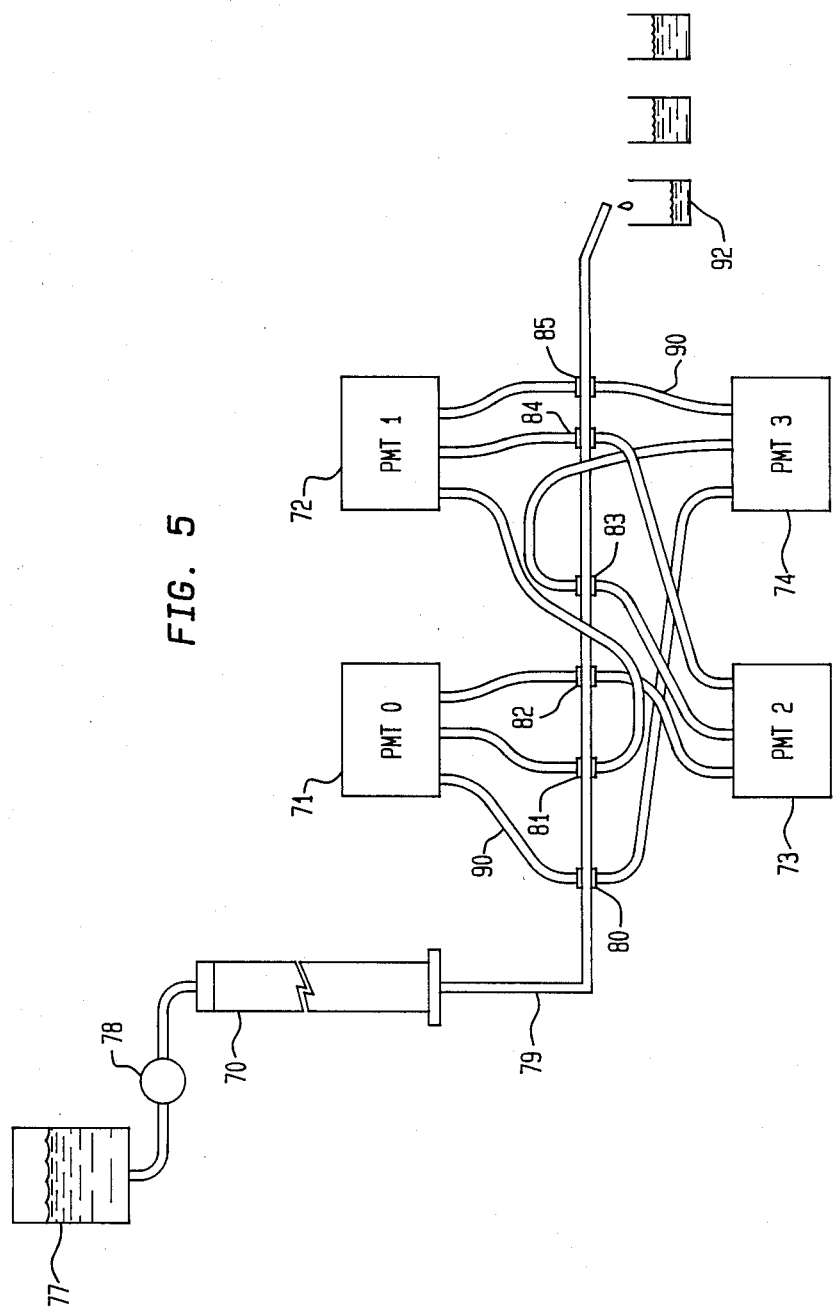
FIG. 5 is a schematic representation of a continuous flow embodiment of the invention which is described in the context of a chromatography column.

FIG. 5 is a schematic representation of a specific, illustrative continuous flow embodiment of the invention which employs a chromatography column 70. In this embodiment, four photomulplier tubes, 71-74, are used to monitor six points, 80-85, along a flow path. Chromatography column 70 is supplied a gradient solvent from a reservoir 77 via a pump 78. The effluent from chromatography column 70 is conducted via an output tube 79 at a flow rate which, in certain embodiments, is known. In certain embodiments, the flow rate is determinable from the characteristics of the pump, and the diameter of the output tube. Thus, the velocity of the various components which preferably are separated in the effluent can be correlated to positions 80-85 along the output tube.

Positions 80-85 along the output tube are coupled optically to a respectively associated pair of the photomultiplier tubes by light pipes 90. As shown in FIG. 5, positions 80-85 are not necessarily equally spaced along the tube, and correlation with the flow rate can nevertheless be achieved as long as the distance therebetween is known. However, the correlation is simplified by spacing the monitoring points along output tubes 79 uniformly. In this application of the invention, the output effluent is collected in collection vials 92 after scintillation monitoring.

It is evident from the system of FIG. 5 that several unique combinations of light pipes, with respect to photomultiplier tubes are possible. These photomultiplier tube combinations include:

$$\begin{bmatrix} 0,3 & 0,1 & 0,2 \\ 1,3 & 2,3 & 1,2 \end{bmatrix}$$

Thus, six discrete positions an be defined using only four photomultiplier tubes. Using the conventional approach of replicating a photomultiplier tube pair at each monitoring point would have required employment of twelve photomultiplier tubes. Considerable economy and simplicity therefore is achieved by the present invention, while simultaneously enjoying the benefit of increased system resolution.

Figure 6:
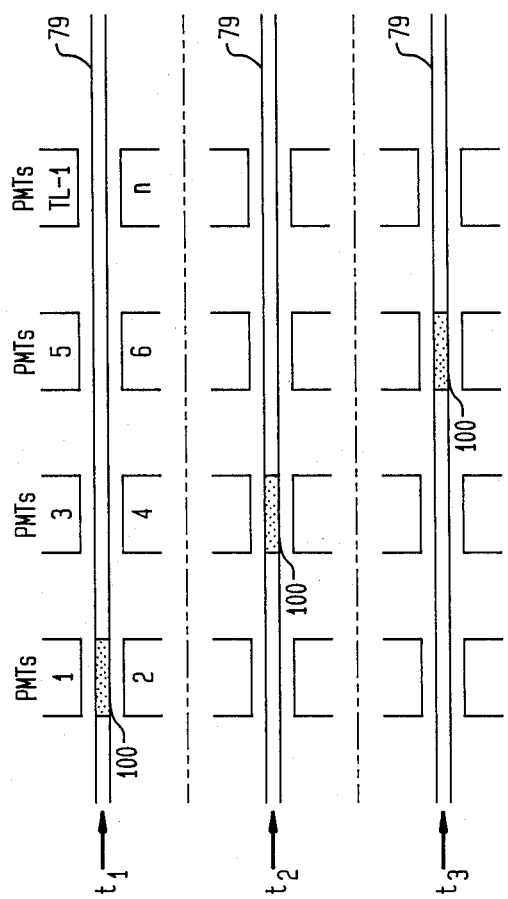
FIG. 6 is a schematic representation which illustrates the manner in which the inventive multiplexing system is employed to increase the effective time that a particular quantum, or slug, of continuously flowing effluent is monitored.

FIG. 6 is a schematic representation illustrating a predetermined quantum of effluent 100 at various times $t_1$, $t_2$ and $t_3$, as it flows along chromatography column output tube 79. In this specific embodiment of the invention, where the photomultiplier tubes are equally spaced along output tube 79, the position of the slug along the tube is correlated directly to time. Thus, it can be seen from this figure that the duration of time during which slug 100 is monitored as it flows along the flow path is extended, the extension of time being a function of the number of photomultiplier tube pairs disposed along the output tube at respective monitoring positions. As discussed hereinabove with respect to FIG. 5, the present invention increases the effective number of monitoring points, without requiring a corresponding number of photomultiplier tubes, and therefore increased resolution and economy are achieved simultaneously.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. An arrangement for monitoring scintillation events at each of a plurality of monitoring points along a flow path of a continuously flowing effluent, the arrangement comprising:

flow tube means for defining the flow path, said flow tube means having m monitoring points therealong, where $m \geq 5$;

n sensor means arranged in the vicinity of the flow path for receiving indications of the scintillation events and producing responsive output electrical signals, where $n < m$;

light guide means for coupling optically each of said monitoring points to two of said sensor means; and coincidence-determining means for identifying a one of said monitoring points at which a scintillation event occurred.

2. The arrangement of claim 1 wherein there is further provided discriminator means coupled to said sensor means for producing an incidence signal when a responsive output electrical signal has a magnitude within a predetermined range.

3. The arrangement of claim 1 wherein there is further provided event cancellation means for determining that output electrical signals have been issued simultaneously by a predetermined number of said sensor means, and conducting a responsive cancellation signal to said coincidence-determining means.

4. The arrangement of claim 3 wherein said predetermined number of said sensor means is at least three.

5. The arrangement of claim 1 wherein there is provided counter means coupled to said coincidence-determining means for counting the scintillation events at each of said monitoring points.

6. The arrangement of claim 5 wherein there is further provided timer means for gating said counter means.

7. A multiplexing system comprising:

n sensors each having an input for receiving an input light signal and an output for producing an output electric signal responsive to said input light signal, where $n > 3$;

flow path means having m light-receiving positions each for receiving a respective source light signal, where $n < m \leq (n/2)(n-1)$;

light transport means for conducting said source light signal from each of said light-receiving positions to said inputs of at least two of said sensors, whereby at least one of said sensors receives a plurality of said source light signals from a respectively associated plurality of said light-receiving positions; and coincidence-determining means for producing a coincidence signal when a preselected plurality of said sensors issue respective output electric signals within a predetermined time period of one another.

8. The multiplexing system of claim 7 wherein there is further provided counter means for producing a numerical value responsive to said coincidence signal.

9. The multiplexing system of claim 7 wherein there is further provided threshold discriminator means having an input for receiving said output electric signal and an output for producing a discriminator signal when said output electric signal is within a range defined by a predetermined threshold magnitude.

10. The multiplexing system of claim 1 wherein there is further provided group monitoring means for disabling said coincidence-determining means when others of said preselected plurality of sensors issue respective output signals within said predetermined time period.

11. A method of monitoring scintillation events simultaneously at each of a plurality of monitoring positions along a flow path of a scintillation fluid, the method comprising the steps of:

installing the scintillation fluid whereby it flows in a flow conduit which defines the flow path;

conducting a light produced by the scintillation fluid in each of the monitoring positions to a respectively associated pair of at least four light sensors, there being fewer of said light sensors than the monitoring positions, whereby each of said light sensors is adapted to receive said light from at least three of the monitoring positions;

measuring an output electric signal from each of said light sensors against a predetermined threshold magnitude;

determining a coincidence of said output electric signals; and counting said coincidence signals to produce a numerical value.

12. The method of claim 11 wherein prior to performing said step of measuring there is provided the further step of amplifying said output electric signals.

13. The method of claim 11 wherein said step of counting includes counting only ones of said output electric signals which have a magnitude greater than said predetermined threshold magnitude.

14. The method of claim 11 wherein said step of counting includes counting only ones of said output electric signals having a magnitude less than said predetermined threshold magnitude.

15. The method of claim 11 wherein said step of measuing is performed to determine whether said output electric signal has a magnitude within a predetermined range of magnitudes.

16. The method of claim 15 wherein said step of measuring is performed in a discriminator.

17. The method of claim 11 wherein there is further provided the step of converting said output electric signal to a digital form.

* * * * *